US007276278B2

(12) United States Patent
Kamiyama et al.

(10) Patent No.: US 7,276,278 B2
(45) Date of Patent: Oct. 2, 2007

(54) IMAGE COVERING LAMINATE FILM AND IMAGE PROJECTION SHEET

(75) Inventors: Koji Kamiyama, Tama (JP); Haruyuki Mikami, Tendo (JP); Shigeaki Dohgoshi, Sagamihara (JP); Joseph C. Carls, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 10/490,974

(22) PCT Filed: Sep. 19, 2002

(86) PCT No.: PCT/US02/29641

§ 371 (c)(1),
(2), (4) Date: Mar. 25, 2004

(87) PCT Pub. No.: WO03/039884

PCT Pub. Date: May 15, 2003

(65) Prior Publication Data

US 2004/0197533 A1 Oct. 7, 2004

(30) Foreign Application Priority Data

Nov. 2, 2001 (JP) ............................ 2001-337886

(51) Int. Cl.
*B32B 3/28* (2006.01)

(52) U.S. Cl. .................... 428/168; 428/167; 428/185.1; 428/204; 428/343; 428/352; 430/11; 430/14; 430/17; 430/18

(58) Field of Classification Search .............. 428/195.1
See application file for complete search history.

(56) References Cited

U.S. PATENT DOCUMENTS

| | | | | |
|---|---|---|---|---|
| RE24,906 | E | 12/1960 | Ulrich | |
| 3,239,478 | A | 3/1966 | Harlan | |
| 4,181,752 | A | 1/1980 | Martens et al. | |
| 4,952,650 | A | 8/1990 | Young et al. | |
| 5,169,727 | A | 12/1992 | Boardman | |
| 5,536,778 | A * | 7/1996 | Kreckel et al. | 524/733 |
| 5,650,215 | A * | 7/1997 | Mazurek et al. | 428/156 |
| 6,153,289 | A | 11/2000 | Murray | |

FOREIGN PATENT DOCUMENTS

JP 2-38090 2/1990

OTHER PUBLICATIONS

Smith Warren J, Modern Optical Engineering, The Design of Optical Systems, pp. 104-105, McGraw-Hill, Inc., © 1966.

* cited by examiner

*Primary Examiner*—Bruce H. Hess
(74) *Attorney, Agent, or Firm*—Trisha D. Adamson

(57) ABSTRACT

The laminate film for covering of an image carried by a support has a construction comprising a transparent base material and a transparent adhesive layer formed on one side of the base material, wherein the adhesive layer is composed of a pressure-sensitive adhesive and has a surface with a fine uneven structure.

10 Claims, 10 Drawing Sheets

IMAGE COVERING LAMINATE FILM AND IMAGE PROJECTION SHEET

TECHNICAL FIELD

The present invention relates to a laminate film. In particular, it relates to a laminate film useful for protecting images such as toner images on transparent sheets.

BACKGROUND

Transparency sheets for image projection usually comprise a transparent plastic film as the support, with a monochrome or color image formed by toner fusion carried as an image on one surface thereof. The toner is generally composed of a binder resin such as polyester resin, a coloring agent (dye or pigment) and a static control agent. The toner is usually used to form a toner image with an electrophotographic system.

In the past, several problems have arisen when transparency sheets are fabricated by forming color images on overhead projector (OHP) transparent films with color copiers or printers employing electrophotographic systems. One of these problems has been insufficient melting of the color toner in the transparent film, resulting in residual uneven sections in the toner image layer. When uneven sections are present in the toner image layer it is difficult to avoid scattering of transmitted light, and this causes considerable reduction in the quality of the projected color image at the stage in which the transparency sheet is actually used in an OHP.

One known method of preventing undesirable light scattering on the surface of the toner image layer is to cover the toner image layer of the transparency sheet with a transparent film. That is, it has been proposed to cover the toner image layer with a transparent film so that the uneven sections of the toner image layer are buried and flattened by the transparent adhesive of the film and scattering of transmitted light is thereby reduced.

More specifically, Japanese Unexamined Patent Publication (Kokai) No. 2-38090, for example, discloses an image covering method characterized in that, after a toner image is formed on the transparent film, a cover sheet comprising a film and/or paper/release agent layer/thermoplastic transparent resin layer is combined with the toner image side of the film from the thermoplastic transparent resin layer side of the cover sheet, and the laminate is subjected to heating and pressure on a roller or plate, the thermoplastic transparent resin is cooled, and then the film and/or paper is released.

With this image covering method and other film covering methods, however, during the hand lamination when the covering sheet or film is manually combined with the color image side of an OHP transparent film, air becomes entrapped between the transparent film and the covering sheet or film, creating a new problem of residual air bubbles. Once air bubbles have been trapped, they are difficult to remove even using a tool such as a squeegee. When air bubbles reside on the color image side of the transparency sheet, they not only reduce the adhesion performance but also cast their shadows which are reproduced as image defects in the projected image, thus impairing the quality of the projected image.

Moreover, a high level of skill can be required for hand laminating covering sheets or films for OHP transparent films. In the case of conventional hand lamination, strong adhesive force is present from the adhesive layer when the covering sheet or film is attached to the OHP transparent film, and the resulting difficulty in achieving adequate positioning often leads to attachment in the wrong position. Reattachment after attachment in the wrong position is very difficult in most cases, and can damage the image sides of transparent films. Thus, there has been a need to provide covering sheets or films, particularly for OHP transparent films, that can be easily and precisely positioned and that can also be easily reattached after attachment in a wrong position.

Referring again to the image covering method described in Japanese Unexamined Patent Publication (Kokai) No. 2-38090, this method requires heat and pressure treatment using special means during lamination. The operation is complicated, the production costs are likely increased, and other problems also occur such as heat deformation of the transparent film or covering sheet during heating.

Difficult storage and filing has been another problem associated with conventional OHP transparency sheets. For example, when prepared transparency sheets are compiled in a binder or the like for storage, it has been necessary to perforate the edges of the transparency sheets, insert each of the transparency sheets into a specialized perforated holder and the close the binder.

SUMMARY

In light of the aforementioned problems of the prior art, the present invention provides an image covering laminate film that can be hand laminated at room temperature and attached onto OHP transparent films. The invention also provides an image covering laminate film that improves the storage and filing properties of OHP transparency sheets.

The laminate film of the invention is laminated onto the image-bearing side of transparent sheets. It may be hand laminated at room temperature without requiring special lamination equipment or skills. Hand lamination can be done using a small rubber roller. The inventive laminate film prevents air entrapment that can cause air bubbles during lamination. Even if air bubbles are incorporated, the laminate film allows them to be easily forced outside. Yet the laminate film also exhibits satisfactory slidability on the surface of the transparent sheet to facilitate the positioning and attachment operations. The inventive laminate film can also enhance the quality of projected images because uneven sections generated from the toner image on the surface of the transparent sheet are buried in the adhesive layer thus producing a flattened image layer. As a result, scattering of transmitted light can be reduced. The invention further relates to an image projection sheet provided with a laminate film of this type. Typical image projection sheets are laminated transparency sheets used for overhead projectors (OHPs).

In one aspect, the present invention provides an image covering laminate film for covering of an image carried by a support (hereunder also referred to as "image-carrying support" or "adherend"), the laminate film being characterized in that it comprises a transparent base material and a transparent adhesive layer formed on one side of the base material, and the adhesive layer is composed of a pressure-sensitive adhesive and has a surface with a fine uneven structure.

In another aspect, the invention provides an image projection sheet comprising a transparent support and a toner image carried on the surface of the support, the image projection sheet being characterized in that a laminate film comprising a transparent base material and a transparent adhesive layer formed on one side of the base material covers the image-bearing side of the support via the adhesive layer, and the adhesive layer is composed of a pressure-sensitive adhesive and has a surface with a fine uneven structure.

BRIEF DESCRIPTION OF THE DRAWINGS

The invention will be further described with reference to the following figures.

The figures are idealized, not drawn to scale, and are intended merely to be illustrative and non-limiting.

DETAILED DESCRIPTION

An image covering laminate film and image projection sheet according to the invention will now be described in detail.

The laminate film of the invention will typically serve as a covering for an image carried by a support. The laminate film comprises a transparent base material and a transparent adhesive layer formed on one side of the base material. The transparent adhesive layer is not particularly restricted so long as it satisfies the conditions mentioned above and described below in detail.

Considering that the effect of the laminate film of the invention is satisfactorily exhibited and light scattering can be prevented particularly when the image is a monochrome or color image, it is most suitable for covering of color toner images. The toner image forming method is not particularly restricted and includes, for example, any method based on an electrophotographic system (electrophotography, electrography, ionography, etc.) that is widely used in the art of image formation. Such image forming methods are described in detail in the patent literature and related documents and will therefore not be repeated here. As will be explained below, the inventive laminate film is particularly useful for covering of OHP transparency sheets, but, if desired, it may be used to enhance or protect the quality of toner image-bearing elements or photographic prints.

Figure 1:
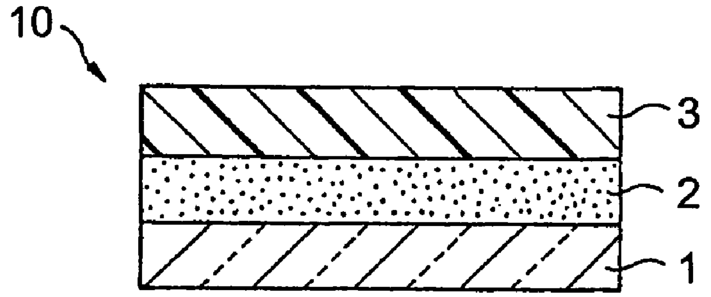
FIG. 1 is a cross-sectional view showing a preferred embodiment of an image covering laminate film according to the invention.

FIG. 1 is a cross-sectional view showing a preferred embodiment of an image covering laminate film according to the invention. The laminate film 10 includes a transparent base material 1 and a transparent adhesive layer 2 that is attachable to the image-bearing side of an image carrying support such as an OHP transparent film (not shown). The surface of the adhesive layer 2 has a fine uneven structure. The adhesive layer 2 is typically covered with a release liner 3 to protect it until use of the laminate film. In order to form a fine uneven structure, which preferably is a combination of protrusions and continuous grooves, to the surface of the adhesive layer 2, the surface of the release liner 3 is preferably provided with depressions and continuous fine protrusions at corresponding positions. While not shown here, the laminate film 10 may also have an additional layer if necessary. The adhesive layer 2 is preferably a pressure-sensitive adhesive, and is preferably non-repositionable. By using a pressure-sensitive adhesive it is possible to achieve firm adhesion between the laminate film and the adherend.

The fine uneven structure of the surface of the adhesive layer 2 functions to expel out air trapped between the laminate film and the image-bearing side of the image carrying support when the former is attached to the latter. The uneven structure preferably has a shape and dimensions allowing it to be incorporated into the adhesive layer and to disappear once the attachment is complete. A suitable uneven structure is a group of protrusions dispersed regularly or at random and continuous grooves formed between the protrusions.

Protrusions and continuous grooves may be used in various combinations to form the uneven structure in the surface of the adhesive layer. Specifically, these two elements may be provided by protrusions of various shapes and sizes for optimum control to maximize their effect. The protrusions may be arranged in either a regular pattern or a random pattern. For example, the protrusions may have a regular pyramidal, triangular pyramidal, conal, truncated pyramidal, truncated conal, hemispherical or spherical shape, with any desired combination of protrusions being used depending on the case. Among these groups of protrusions, the border sections between adjacent protrusions will normally be lower than the other sections of the protrusions, and therefore continuous grooves according to the invention may thus be formed.

Figure 2:
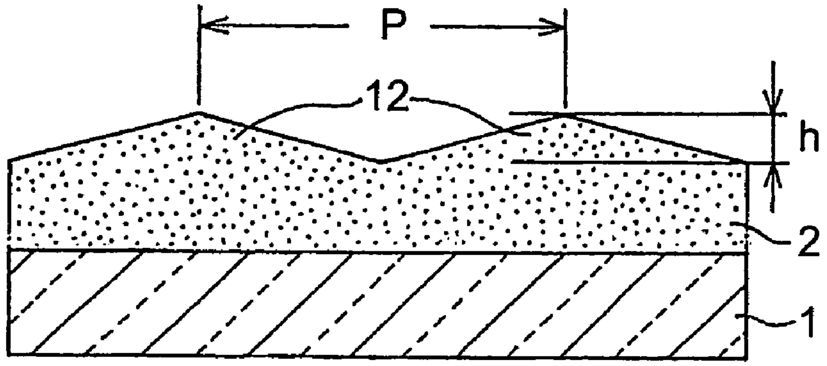
FIG. 2 is a cross-sectional view showing the construction of the adhesive layer of the laminate film of FIG. 1.
Figure 3:
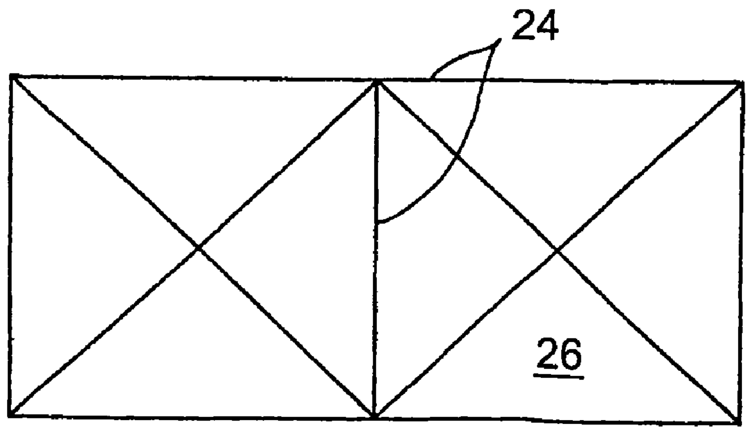
FIG. 3 is a plan view showing the construction of the adhesive layer of FIG. 2.

FIG. 2 and FIG. 3 are, respectively, a cross-sectional view and plan view of a preferred embodiment of a fine uneven structure for a laminate film according to the invention. As shown here, the fine uneven structure 12 is constructed so that the regular pyramidal protrusions 26 are positioned at equal spacings on the surface of the adhesive layer 2, which is coated on the surface of the transparent base material 1. V-shaped continuous grooves 24 in a lattice pattern between each of the protrusions 26. As a result of the arrangement of the protrusions 26 and continuous grooves 24, it is possible to simultaneously improve the air removability and the slidability, and the dense arrangement of protrusions also improves the attachment manageability and prevents reduced light transmittance. The improved air removability also allows lamination to be carried out at room temperature without any special lamination equipment or skills.

Other laminate films according to the invention can usually be applied in the same manner, but the laminate film illustrated in FIG. 2 and FIG. 3 preferably has the group of protrusions 26 formed on the surface of the adhesive layer 2 at a pitch p (average value of the distance between centers of adjacent protrusions 26) of no greater than 400 μm. If the pitch p between protrusions is greater than 400 μm, a pattern of protrusions may appear on the surface of the laminate film after attachment, resulting in reduced quality of the projected image. The height h of the protrusions 26 as measured from the bottom of the continuous grooves 24 is preferably in the range of 3-30 μm. If the height h of the protrusions 26 is less than 3 μm the air removability is not exhibited, while if it is greater than 30 μm the quality of the projected image is likely to be impaired. The length of the long sides of the continuous grooves 24 is preferably from 1 μm to the size of the pitch p. If the length is less than 1 μm, the air removability is not likely exhibited. Considering the construction of the continuous grooves, the length of the long sides will never be longer than the pitch.

The surface of the adhesive layer in the image covering laminate film of the invention preferably also contains fine particles, and the fine particles are preferably non-adhesive. As will be explained in detail below, the presence of such fine particles can contribute to further improved positionability and slidability for the lamination treatment.

Figure 4:
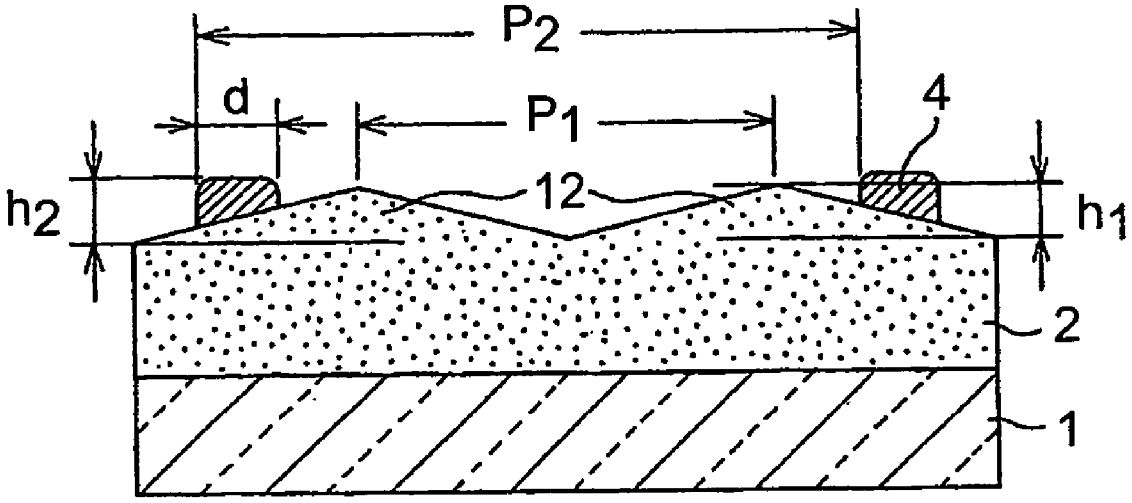
FIG. 4 is a cross-sectional view showing the construction of the adhesive layer of a laminate film of the invention in which fine particles are embedded.
Figure 5:
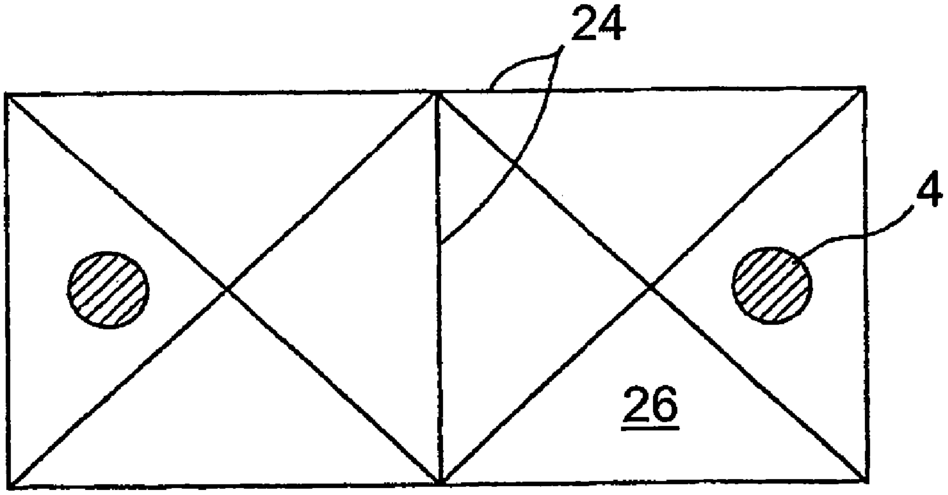
FIG. 5 is a plan view showing the construction of the adhesive layer of FIG. 4.

FIG. 4 and FIG. 5 are, respectively, a cross-sectional view and plan view of an embodiment wherein fine particles 4 are embedded in the surface of the adhesive layer 2 of the laminate film. As shown in these illustrations, the fine uneven structure 12 contains fine particles 4 composed of glass beads in the slanted surface of the regular pyramidal protrusions 26. Each of the fine particles 4 is anchored with cellulose resin. In the embodiment shown here, one fine particle 4 is embedded in each protrusion 26, but the number of fine particles 4 may be two or more as necessary. Depending on the need, some of the protrusions 26 may be free of embedded fine particles 4. The fine particles 4 are cylindrical in these illustrations, but they may have the same or different shapes and dimensions.

In the laminate film shown in FIG. 4 and FIG. 5, the group of protrusions 26 dispersed on the surface of the adhesive layer 2 is preferably formed with a pitch $p_1$ (average value of the distance between centers of adjacent protrusions 26) of no greater than 400 μm, as explained above. The height $h_1$ of each of the protrusions 26 from the bottoms of the continuous grooves 24 is preferably in the range of 3-30 μm. In most cases, the fine particles 4 embedded in the protrusions 26 will preferably have a diameter d of about 1-100 μm, a pitch $p_2$ (average value of the distance between adjacent fine particles 4) of no greater than 400 μm and a height $h_2$ (height of each of the fine particles 4 from the bottoms of the continuous grooves 24) of about 5-50 μm.

Figure 6:
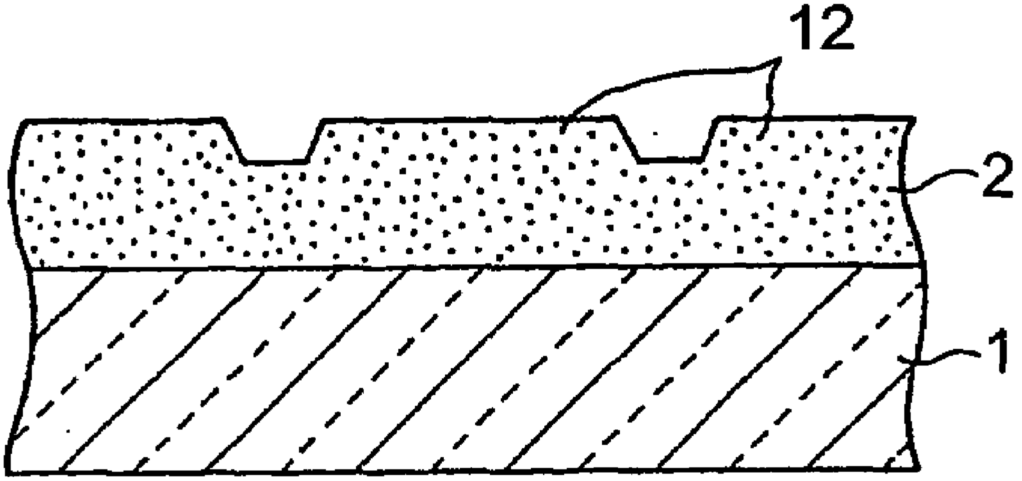
FIG. 6 is a cross-sectional view showing the construction of the adhesive layer of a laminate film according to the invention.
Figure 7:
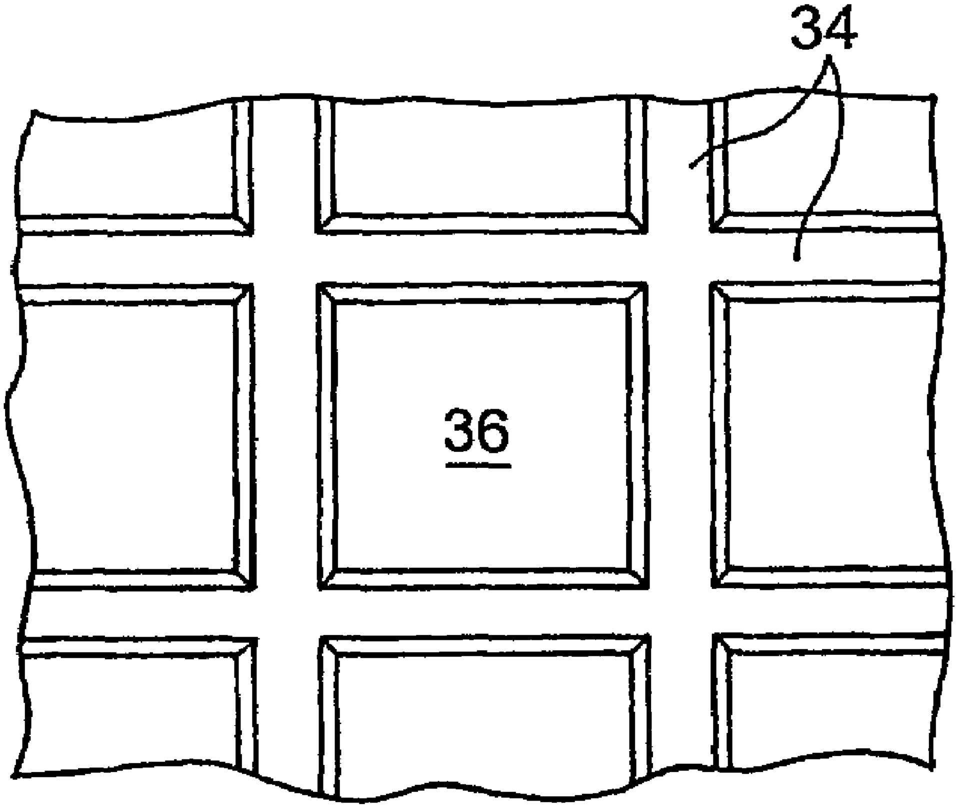
FIG. 7 is a plan view showing the construction of the adhesive layer of FIG. 6.

FIG. 6 and FIG. 7 are, respectively, a cross-sectional view and plan view of another preferred embodiment of a fine uneven structure in a laminate film according to is the invention. As shown in these illustrations, the fine uneven structure 12 is constructed so that truncated pyramidal (or trapezoidal) protrusions 36 are situated at equal spacings on the surface of the adhesive layer 2 coated on the surface of the transparent base material 1, with inverted trapezoidal continuous grooves 34 running in a lattice pattern between each of the protrusions 36. As a result of the arrangement of the protrusions 36 and continuous grooves 34 in this pattern, it is possible, as with the embodiment described above, to simultaneously improve the air removability and the slidability, and the dense arrangement of protrusions also improves the attachment manageability and prevents reduced light transmittance.

Figure 8:
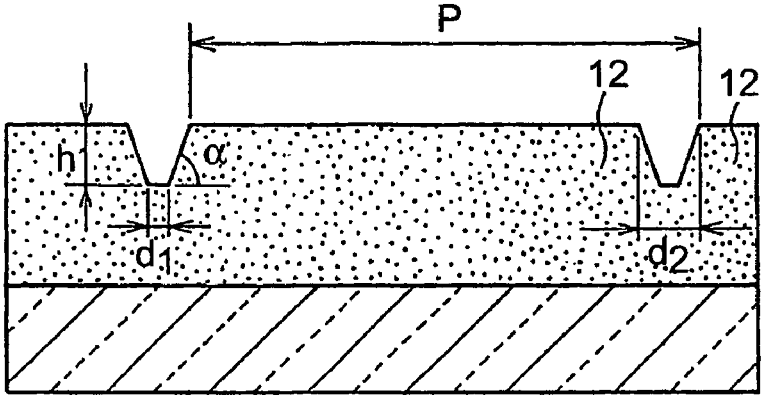
FIG. 8 is a cross-sectional view showing the dimensions of the adhesive layer of FIG. 6.

The uneven structure of the laminate film illustrated in FIG. 6 and FIG. 7 may have the following dimensions, for example, based on FIG. 8. The pitch between adjacent protrusion is less than 400 μm; the height of each protrusion is about 3-30 μm, as measured from the bottom of the continuous groove, the width ($d_1$) of the base of the continuous groove is from 0 μm to a size adequate for a base angle α of 1-90°; and the width ($d_2$) of the continuous groove is from 1 μm to the size of the pitch.

Figure 9:
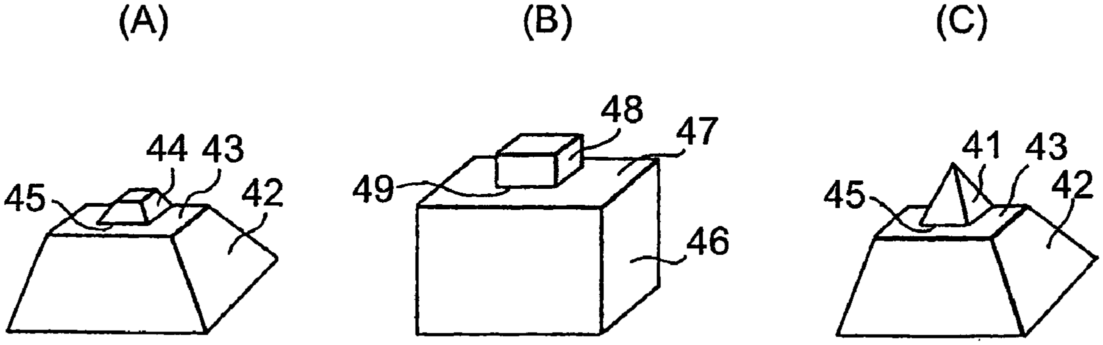
FIG. 9 is a perspective view showing examples of protrusions that may be added to a laminate film according to the invention.

As mentioned above, various modifications may be made to the protrusions in order to form a finer uneven structure. FIG. 9 shows schematic views of three different protrusion embodiments that may be used in this invention. The protrusions shown here will be referred to as "double mechanism structures" for the purpose of the present invention. By stacking two structures, it is possible to further reduce the initial contact surface of the adhesive and reinforce the positionability imparted to the laminate film. FIG. 9(A) shows a truncated pyramid 42 with an exposed surface 43. A second pyramid 44 with a base 45 is situated on the exposed surface 43. FIG. 9(B) shows another embodiment of a double mechanism structure according to the invention. A rectangular mechanism 46 provides a base surface 47 which receives the base 49 of a second smaller rectangular mechanism 48. In most cases, the surface of the base of the second structure will generally be smaller than the exposed surface of the first mechanism. In order to achieve preferred positioning properties for the invention, different arrangements and shapes may be combined with the basic structure. FIG. 9(C) is a modification of the double mechanism structure shown in FIG. 9(A). The protrusions shown here consist of a truncated pyramid 42 with an exposed surface 43, wherein a pyramid 41 having a base 45 is provided on the exposed surface 43.

Figure 10:
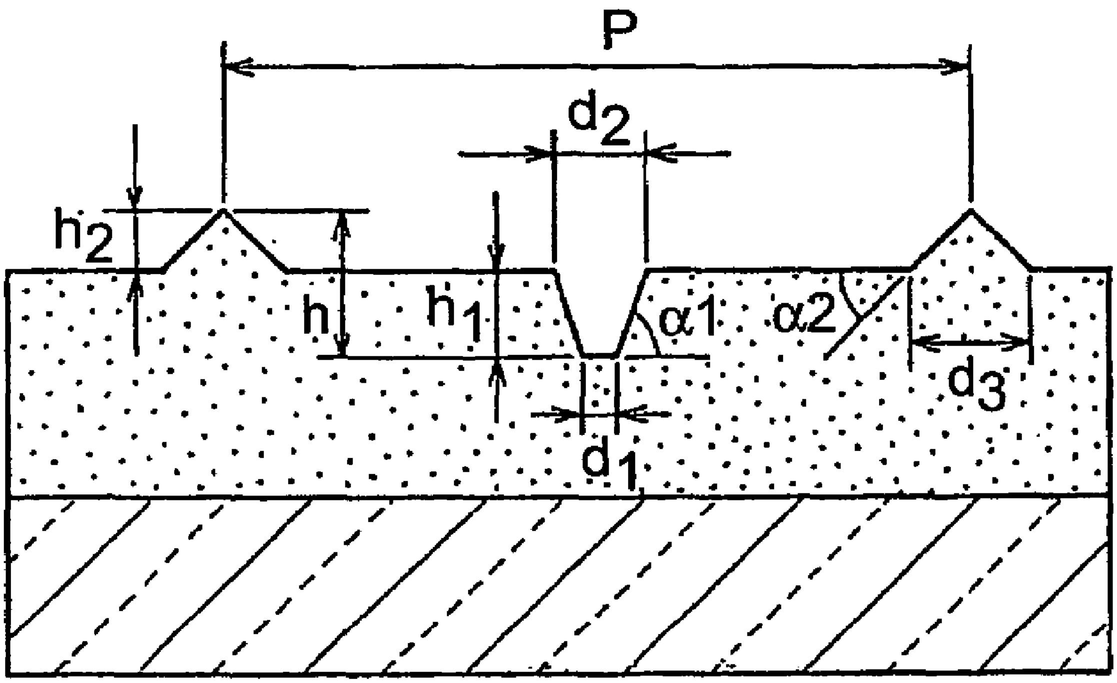
FIG. 10 is a cross-sectional view showing the dimensions of an adhesive layer provided with the type of protrusion shown in FIG. 9(C).

As further explanation, the uneven structure of the laminate film with protrusions as shown in FIG. 9(C) may have the following dimensions, for example, based on FIG. 10. The pitch between adjacent protrusions is less than 400 μm; the height h is about 30-30 μm; the height hi is about 1-25 μm; the height $h_2$ is about 1-20 μm; the base width $d_1$ of continuous grooves is from 0 μm to size adequate for a base angle $\alpha_1$ of 1-90°; top width $d_2$ of continuous grooves is from 0 μm to size adequate for a base angle $\alpha_1$ of 1-90° and a base angle $\alpha_2$ of 1-90°; and the base side $d_3$ of pyramid 41 is from 0 μm to size adequate for a base angle $\alpha_2$ of 1-90°.

When the inventive laminate film is used to store and file OHP transparencies, it is preferably constructed with a strip which extends out from one edge. The strip may be laid by any of several methods, but it is particularly preferred to form the strip by designing the edge of the transparent base material of the laminate film to extend at a prescribed length from the edge of the laminate film, or to fabricate a strip separately from the laminate film and attach the strip to the edge of the laminate film at the desired stage.

Figure 11:
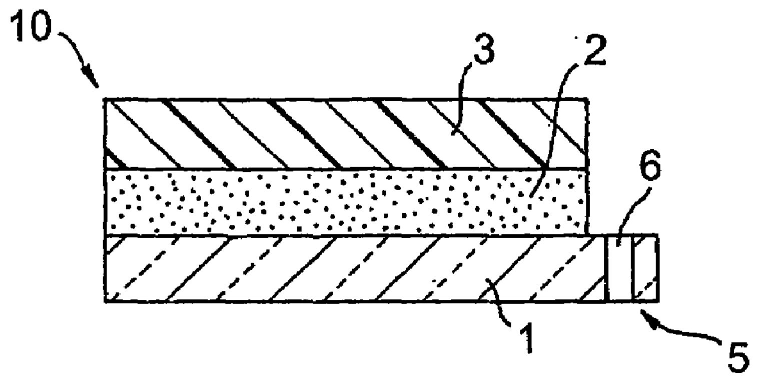
FIG. 11 is a cross-sectional view showing the construction of a strip-attached laminate film according to the invention.
Figure 12:
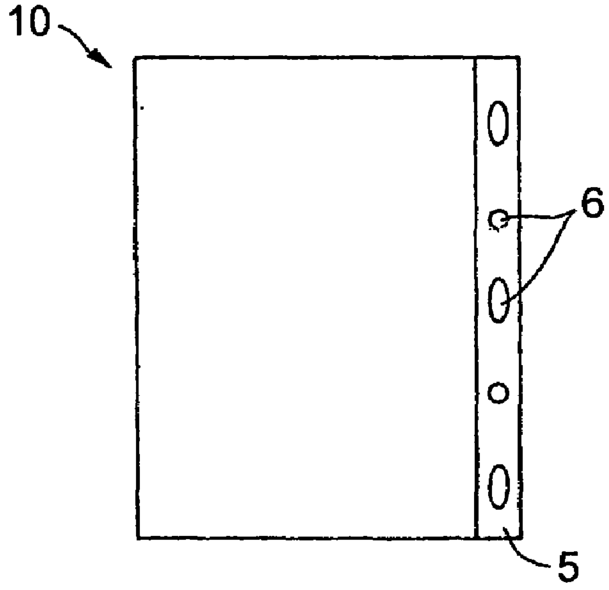
FIG. 12 is a plan view showing the construction of the strip of the laminate film of FIG. 11.

FIG. 11 and FIG. 12 show a preferred embodiment of a laminate film with a strip. The laminate film 10 shown here is based on the laminate film explained above with reference to FIG. 1, and therefore comprises a transparent base material 1 and a transparent adhesive layer 2 and release liner 3. As shown in these illustrations, one of the edges of the base material 1 extends out at a prescribed length to form a strip 5. Small holes 6 are formed at predetermined positions in the strip 5. The small holes 6 can be advantageously used to file the laminate film 10 (or an image projection sheet fabricated using it) in a binder or the like. Thus, the holes 6 may be formed in any desired number and sizes depending on the intended use of the laminate film. The strip 5 may, of course, be formed without holes if desired.

As mentioned above, the laminate film of the invention possesses various constructions and features within the scope of the invention. The constructions and features of the laminate film of the invention will now be explained in further detail.

The transparent base material may be constructed of any of several plastic materials that are commonly used in the technical field. Examples of suitable base materials include, but are not limited to, polyester resin, polystyrene resin, polycarbonate resin, vinyl resin, polyvinyl chloride resin, plasticized polyvinyl chloride resin, polyurethane resin, polyethylene resin, polypropylene resin, fluorine resin and the like. A particularly preferred plastic base material for carrying out the invention is polyethylene terephthalate (PEI). This resin is preferred because of its excellent transparency, strength and rigidity. The thickness of the base material may vary widely depending on the intended use, but will generally be about 300 μm or less, and preferably in a range of about 25-100 μm.

The base material may be subjected to primer treatment if desired to increase the adhesion between the base material and the adhesive layer formed on it.

The exposed, ie., non-adhesive side, of the base material may contain an image or print. A more unique projection effect is achieved by projecting a pattern (e.g., a background) derived from a print, in combination with the image projection. In general, the surface will be covered with a clear layer after an ink layer has been formed to produce the desired print. Both the ink layer and the clear layer may be formed using common techniques used for production of marking films.

The adhesive layer of the inventive laminate film is not particularly restricted so long as the prescribed level of transparency is ensured. A pressure-sensitive adhesive is preferably used. The pressure-sensitive adhesive is also preferably non-repositionable. Pressure-sensitive adhesives useful for formation of the adhesive layer include, but are not limited to, the following: polyacrylate, tackifying rubber, tackifying synthetic rubber, ethylene-vinyl acetate, silicone, and the like. Acrylic-based adhesives suitable for carrying out the invention are disclosed, for example, in U.S. Pat. Nos. 3,239,478, 4,181,752, 4,952,650, 5,169,727 and Reissued Pat. No. 24,906. Preferred pressure-sensitive adhesive classifications are allyl acrylate homopolymers and copolymers, and their poly copolymers.

An adhesive may be, e.g., a polymer coated and dried onto the release liner after dispersion in a solvent or water, and it may also be crosslinked. If a solvent-based or aqueous pressure-sensitive adhesive composition is used, the adhesive layer may be subjected to a drying step to remove all or most of the solvent or water. The adhesive may alternatively be a hot melt adhesive. A low molecular polymerizable adhesive composition may also be coated onto the release liner and polymerized or crosslinked by heating, UV irradiation, electron beam irradiation or the like.

The adhesive may also contain one or more different additives if necessary. Depending on the polymerization method, application method and final use, additives such as initiators, crosslinking agents, plasticizers, tackifiers, chain transfer agents, antioxidants, stabilizers, flame retardants, viscosity reinforcers and the like, or mixtures thereof, may be used.

The thickness of the adhesive layer may be varied within a wide range depending on numerous factors including the composition of the adhesive, the shapes and dimensions of the protrusions and continuous grooves, the type of adherend and the thickness of the base material. The thickness of the adhesive layer is generally preferred to be in the range of about 10-100 μm.

As mentioned above, a plurality of protrusions are dispersed in the surface of the adhesive layer to form the fine uneven structure, and if necessary at least one fine particle may be provided on the surface of the each protrusion. The shape of the protrusions is not particularly restricted. Since the fine particles are optional, the protrusions may contain no fine particles or only some of the protrusions may contain fine particles. The fine particles are preferably non-adhesive.

The material and shape of the fine particles provided on the surface of the protrusions are not particularly restricted so long as they are able to contribute satisfactory slidability to the laminate film on the adherend, such as an OHP transparent film. However, the fine particles preferably have a substantially spherical or nearly spherical shape in order to achieve satisfactory slidability. Glass beads are particularly effective for carrying out the invention because they can be produced economically to substantially uniform dimensions. Other useful fine particles include ceramic particles, metal particles and polymer particles. If necessary, electrical conductive particles or fine spheres of an adhesive may be used.

The size of the fine particles may be varied within a wide range. However, in order to avoid reduced slidability, to avoid damage to the base material, and to avoid reduced light transmittance of the resulting laminate film, the size of the fine particles is preferably no greater than the thickness of the adhesive layer in which they are provided. The size of the fine particles will usually be in a range of about 1-100 μm in terms of the average diameter. For an adhesive layer thickness of approximately 25 μm, an average diameter of less than about 20 μm is preferred, with the range of about 5-15 μm being more preferred.

In addition to the protrusions described above in the adhesive layer of the laminate film, fine continuous grooves are also formed between each protrusion, being limited by the peripheral edges of the adhesive layer. The continuous grooves are extremely fine, and their presence typically cannot be observed by the naked eye. That is because the continuous grooves cannot be clearly seen by visual observation from any plane, they are of a fineness which can only be observed microscopically. W. J. Smith in *Modem Optic Engineering*, pp. 104-105, published 1966 by McGraw-Hill Co. states that vision is "defined and measured as the visual angle size of the smallest character that can be distinguished". Normal vision is considered to be that where the smallest distinguishable character forms an arc with an angular height of 5 minutes on the retina. For a typical observation distance of 250 mm (10 inches), this would be a lateral distance of 0.36 mm (0.0145 inch) of the distinguished object.

The continuous grooves formed in the adhesive layer, while being finely formed, functions to expel out air trapped between the laminate film and the adherend (such as an OHP transparent film) when the former is attached to the latter ("air removal"). Once attachment of the laminate film has been completed, the continuous grooves themselves disappear by being incorporated into the adhesive layer, thus eliminating any adverse effect the continuous grooves may have on light transmittance.

The shapes and dimensions of the continuous grooves are not particularly restricted so long as the aforementioned function and effect are achieved. For example, although the continuous grooves may have various modifications depending on the working method used, they preferably have a V-shaped, U-shaped, rectangular or inverted trapezoidal shape when viewed in the cross-sectional direction. The limit to the dimensions of the continuous grooves may be explained in terms of the aspect ratio. The aspect ratio is defined as the ratio between the maximum microscopic dimension of the continuous groove in the direction parallel to the plane of the adhesive layer and the maximum microscopic dimension of the continuous groove in the direction perpendicular to the plane of the adhesive layer. The aspect ratio can be measured by determining the cross-sectional dimensions of the continuous groove at an angle perpendicular to the wall of the groove. The limit to the aspect ratio will vary depending on the type of continuous groove, but will normally be in the range of about 0.1-20, and preferably in the range of about 10-15.

The continuous grooves can be formed on the surface of the adhesive layer in a variety of different patterns. The continuous grooves may be arranged in random, or in a regular pattern. The "pattern" of the continuous grooves includes primarily linear patterns and primarily curved patterns. A plurality of different groove patterns may also be combined to form one connected continuous groove pattern on the surface of the adhesive layer.

The continuous grooves are preferably formed as continuous fine protrusions on the surface of the release liner facing the adhesive layer and may be formed by covering the adhesive layer therewith. Thus, the fine protrusions of the release liner may have a shape interlocking with the continuous grooves, and specifically may have a triangular, inverted U-shaped, rectangular or trapezoidal cross-section.

The total thickness of the laminate film of the invention (ie., the sum of the thicknesses of the base material and the adhesive layer, and also including the thicknesses of any additional layers if present) may vary widely depending on the particular laminate film, but is usually preferred to be in the range of about 50-300 μm.

The release liner may be constructed in any of a variety of forms. The release liner preferably contains depressions and continuous fine protrusions on its surface, while the depressions and fine protrusions are preferably of a form corresponding to the shapes and dimensions of the protrusions and continuous grooves required for the adhesive layer of the intended laminate film.

The release liner may be constructed from a variety of base materials. The most suitable base materials are paper or plastic materials, such as polyethylene resin, polypropylene resin, polyester resin, cellulose acetate resin, polyvinyl chloride resin, polyvinylidene fluoride resin or the like. Paper or another material that has been coated or laminated with plastic materials can also be used. Embossable coated paper or thermoplastic films may be used directly, but they are preferably used after silicone treatment or treatment by other methods to improve the release properties. The thickness of the release liner will differ considerably depending on the desired effect. The thickness of the release liner is usually preferred to be in the range of about 30-300 μm. A desired structure can be formed in the release liner using the various techniques disclosed in U.S. Pat. No. 5,650,215.

Depressions and fine protrusions can be created in the release liner using various techniques including embossing. A specialized master tool using the microrib location technique developed by the present applicant is preferably used to transfer its pattern to the surface of the release liner.

The laminate film of the invention may be produced using any of various commonly used techniques. It may be produced by any combination of the following processing steps.

(1) A step of forming a plurality of fine depressions in a predetermined pattern on the surface of the release liner that is to be adhered to the adhesive layer of the laminate film. For example, one useful release liner for this purpose is a "polycoat liner" which has a polyethylene coating formed on both sides of a paper base material. A polyester base material may be used instead of a paper base material. One of the polyethylene coatings of the release liner is coated with a silicone solution for release treatment. Depressions are then formed in the silicone treated polyethylene coating by embossing. The embossing may be accomplished, e.g., by pressure rolling the polyethylene coating on one side of the release liner using an emboss roll known as a "master tool". The depressions may alternatively be formed in the release liner by another type of mechanical working or etching treatment instead of embossing with a master tool.

(2) An optional step of filling at least one fine particle into each of the depressions formed in step (1). For example, fine particles (such as glass bead clusters) are filled into the depressions formed in the previous step, usually in such a manner as to be completely embedded in the depressions, in order to improve the slidability. For filling of glass beads, the glass beads are preferably dispersed in a cellulose resin to obtain a slurry solution which is then coated over the entirety of the release liner surface.

(3) A step of raking off the excess fine particles not filled in the depressions using a doctor plate, for example, when fine particles are used. Air blasting may be used instead of a doctor plate.

(4) A step of creating a fine structured surface comprising continuously formed fine protrusions on the surface of the release liner provided with depressions (filled with fine particles depending on the case). For example, fine protrusions are formed by reembossing on the polyethylene coating of the release liner. The embossing may be accomplished by the method described above, or by another method depending on the case. The surface pattern of the emboss roll is transferred to the polyethylene coating to obtain a release liner with fine protrusions.

(5) A step of coating a pressure-sensitive adhesive onto the fine structured surface of the release liner to a thickness sufficient to completely cover the fine structured surface, to form an adhesive layer. For example, a selected pressure-sensitive adhesive is applied to a prescribed thickness onto the polyethylene coating of the release liner with fine protrusions, and then dried and cured. The pressure-sensitive adhesive may be applied using a common coating method such as bar coating.

(6) A step of laminating a base material for the laminate film onto the adhesive layer of the release liner to complete the intended laminate film. For example, a laminate film base material is laminated after forming the adhesive layer on the release liner. The base material may be laminated by a common laminating method using a pressure roller or the like.

As mentioned above, these steps may be carried out in a different order if necessary, and additional steps may also be carried out depending on the desired construction for the laminate film.

The image covering laminate film of the invention may be used in a variety of technical fields to take advantage of its excellent properties, but it may be used with particular advantages for production of image projection sheets. The types of image projection sheets that are especially useful are OHP transparency sheets having images formed by toner fusion. That is, while images can also be formed by ink-jet printing methods for production of image projection sheets, it is most advantageous for carrying out the invention to form images using toner as the coloring material. The toner image forming method is not particularly restricted, and an electrophotographic method is a typical example. More specifically, OHP transparency sheets with toner images may be advantageously produced by using, for example, a widely available color laser beam printer (CLBP) for fusion of the color toner image onto a specialized transparent film.

Figure 13:
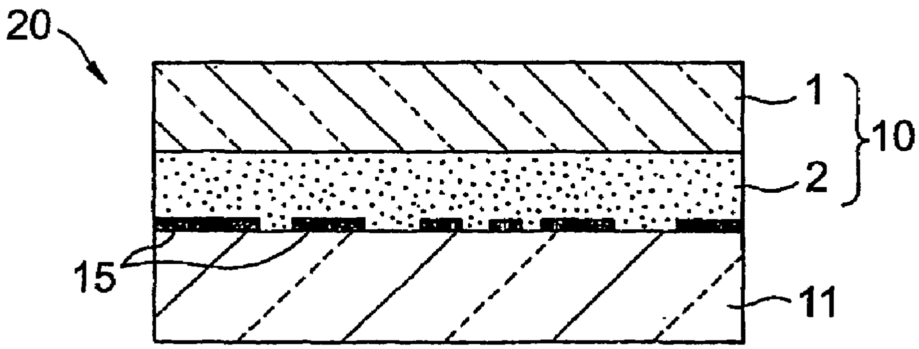
FIG. 13 is cross-sectional view showing a preferred embodiment of an image projection sheet according to the invention.
Figure 14:
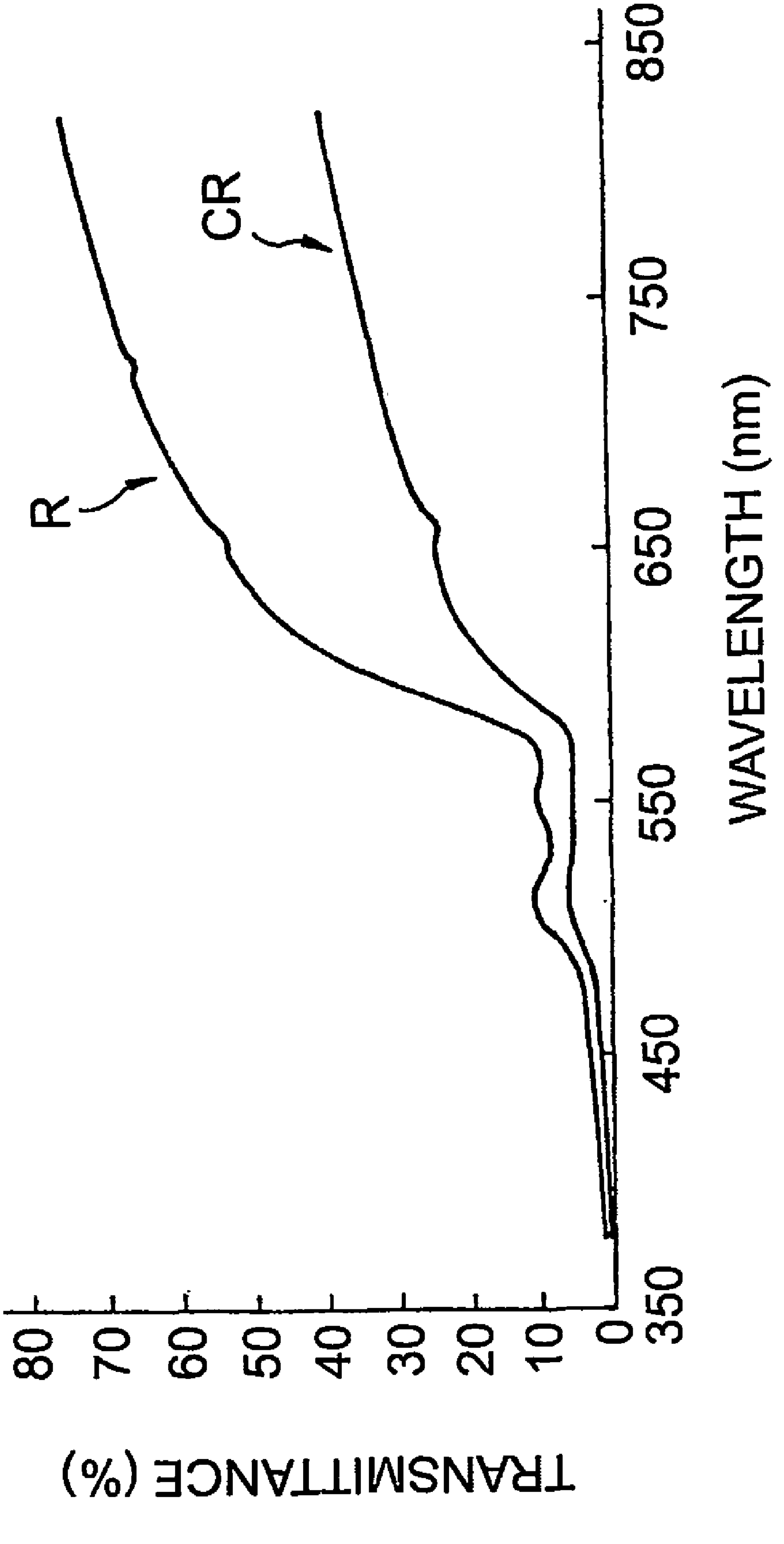
FIG. 14 is a graph showing a light transmittance curve for the red image-bearing transparency sheet fabricated in Example 2.
Figure 15:
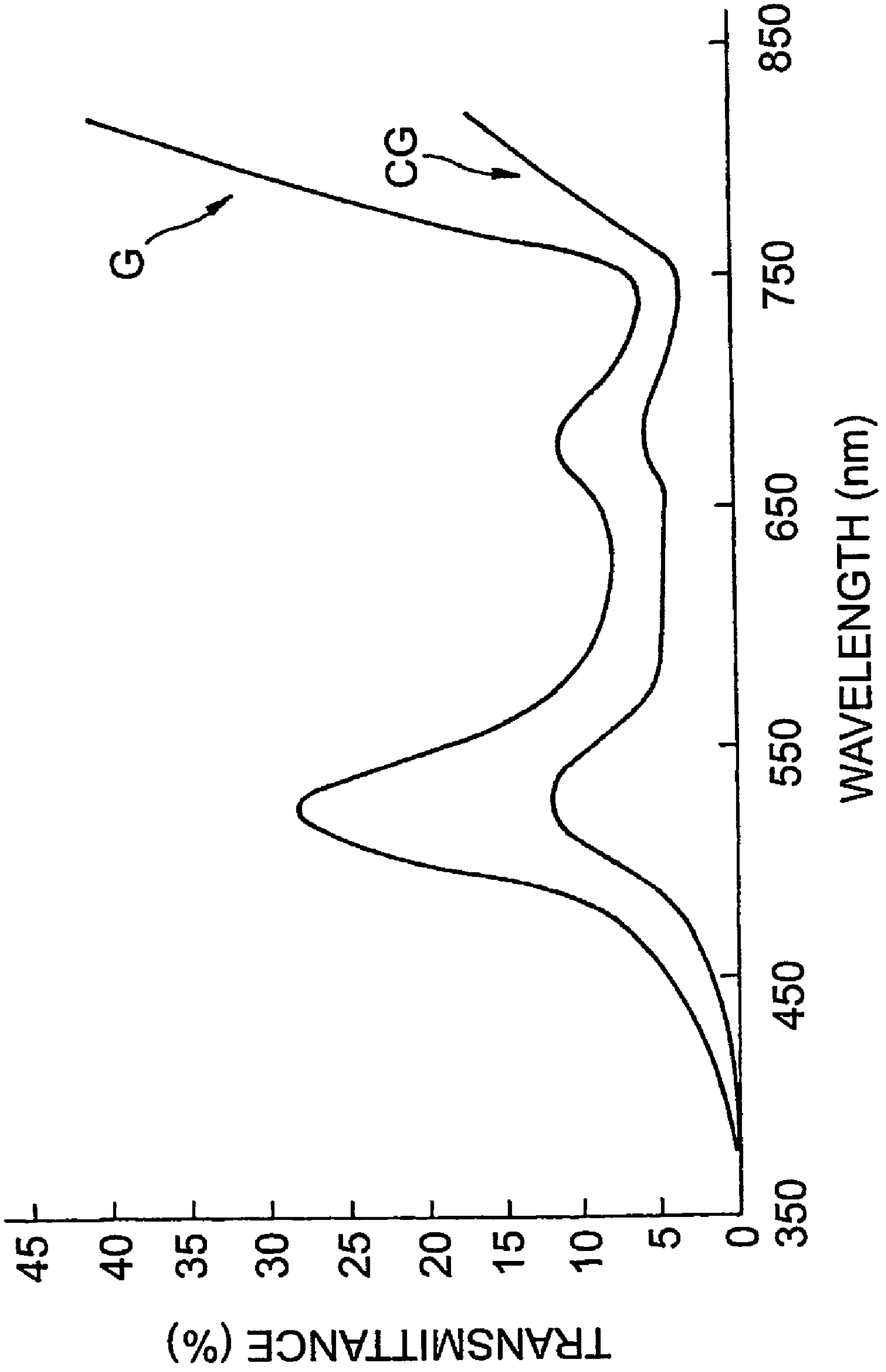
FIG. 15 is a graph showing a light transmittance curve for the green image-bearing transparency sheet fabricated in Example 2.
Figure 16:
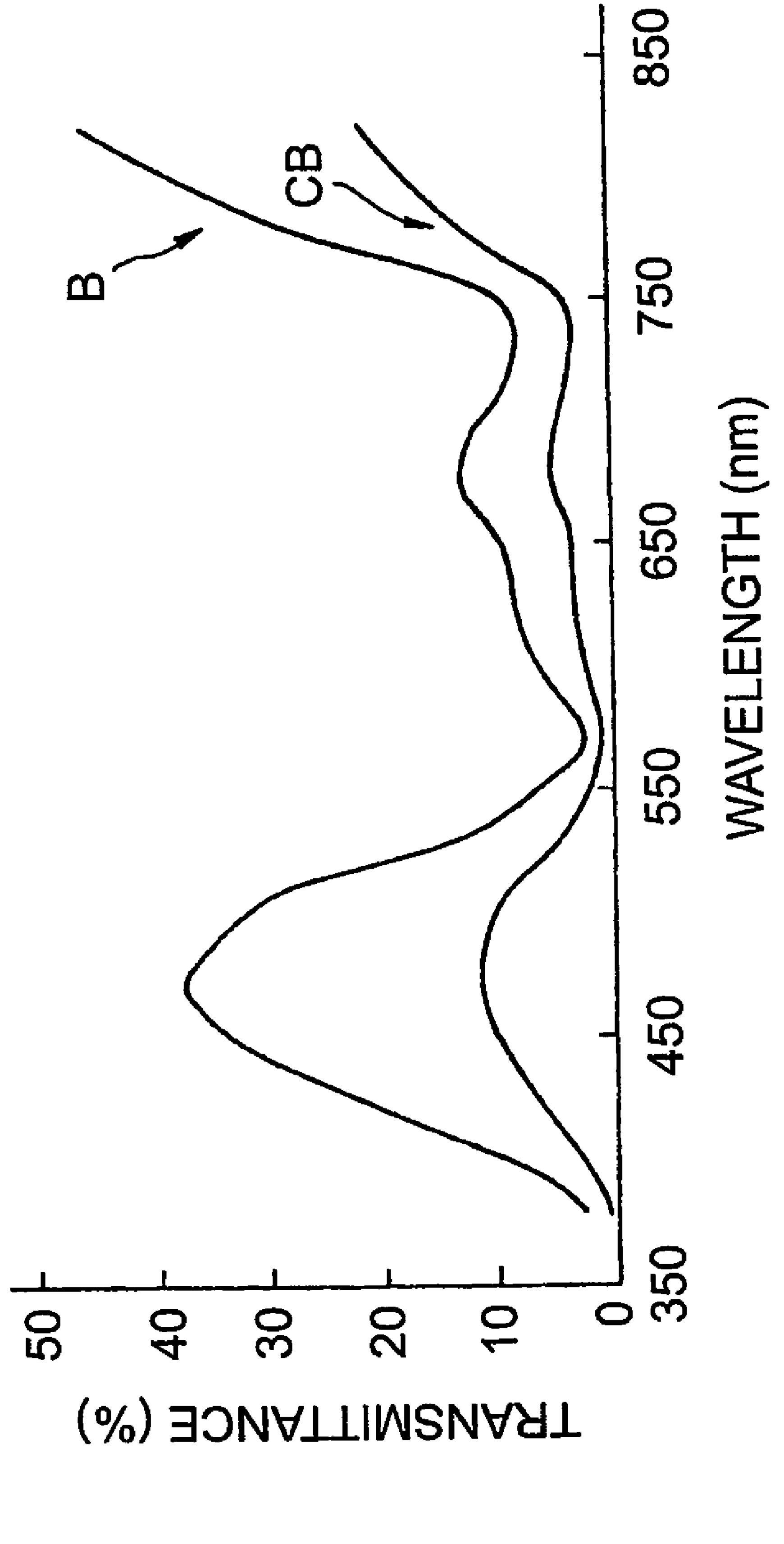
FIG. 16 is a graph showing a light transmittance curve for the blue image-bearing transparency sheet fabricated in Example 2.
Figure 17:
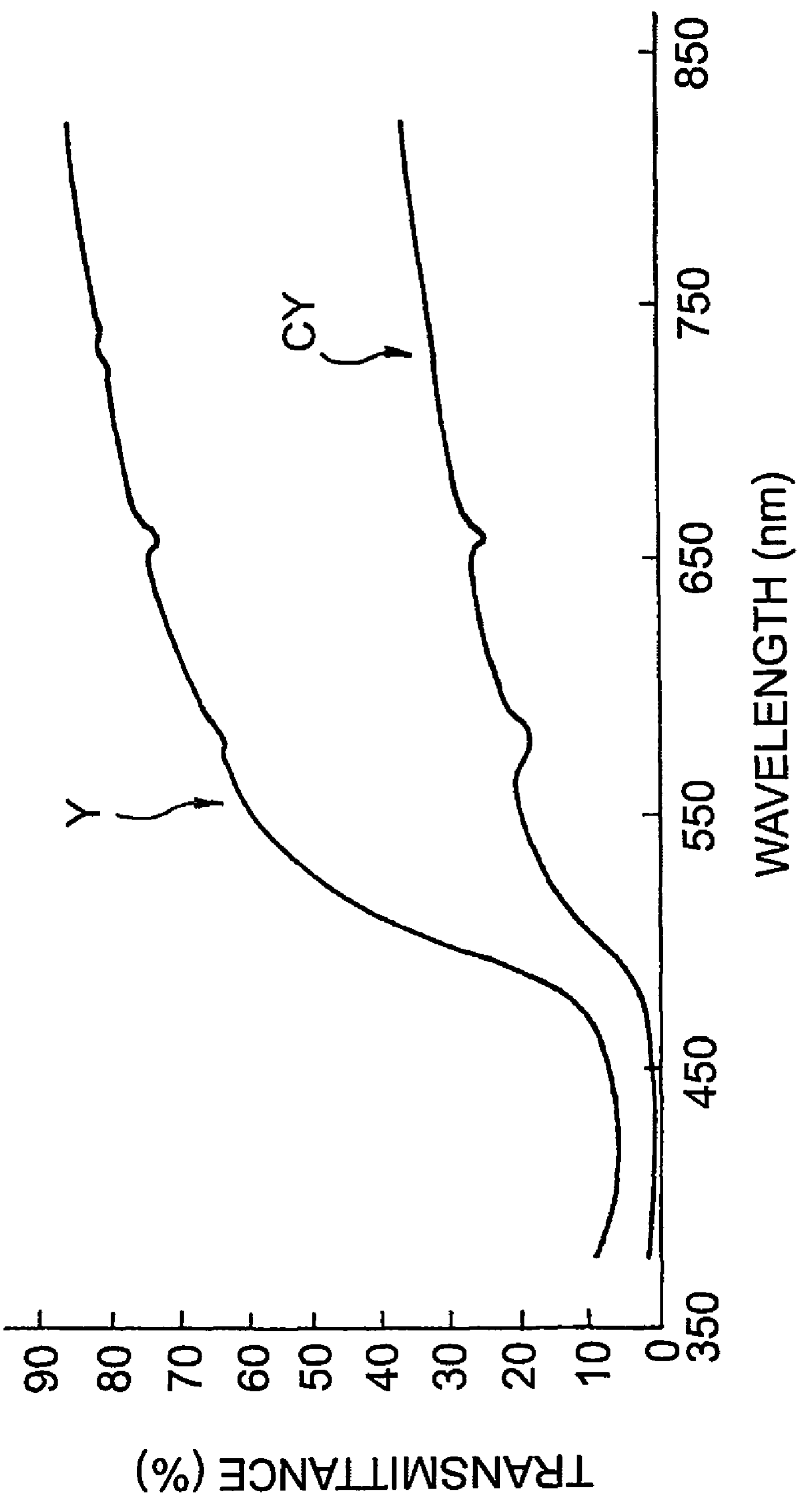
FIG. 17 is a graph showing a light transmittance curve for the yellow image-bearing transparency sheet fabricated in Example 2.

FIG. 13 shows an OHP laminated transparency sheet as a preferred embodiment of an image projection sheet according to the invention. The laminated transparency sheet 20 has a toner image 15 on the surface of a transparent support (OHP transparent film) 11, and the side of the support 11 containing the toner image 15 is covered with a laminate film 10 according to the invention, through an adhesive layer 2. As a result of covering the toner image 15 with the laminate film 10, the surface of the toner image 15 is flattened so that inconveniences such as inclusion of air bubbles are eliminated.

In the image projection sheet of the invention, the support carrying the toner image may be formed of any material so long as it is transparent and causes no adverse effect on the image projection. Considering light transmittance, manageability and cost, it is most advantageous to form the support of a plastic material. Suitable plastic materials include, but are not limited to, polyester resin, polypropylene resin, polyvinyl chloride resin, polyurethane resin, polystyrene resin, polycarbonate resin and the like. A typical support is the OHP transparent film described above.

For production of an image projection sheet according to the invention, it is necessary to position the laminate film of the invention on the image-formed adherend, such as an OHP transparent film, before lamination. The positioning operation for conventional laminate films has been associated with serious difficulties. In the case of the inventive laminate film its fine structured surface allows the laminate film to be shifted across the surface of the adherend until pressure is applied, causing the adhesive to wet the surface of the adherend. An appropriate level of pressure and the resultant wetting produce a satisfactory bond between the adhesive and the adherend.

Also, by firmly pressing the laminate film against the adherend it is possible to expel air confined in the continuous grooves out to the periphery of the film, thereby eliminating air bubbles. Because the fine continuous grooves and protrusions of the laminate film undergo substantially complete crushing and the fine particles become buried in the adhesive layer after the film is attached to the adherend, the amount of adhesive in contact with the adherend may be increased. This ensures that the laminate film of the invention will have the desired level of adhesion for the adherend.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all parts are by weight.

Example 1

An image covering laminate film with an adhesive layer was fabricated and used to make a laminated transparency sheet for an OHP as explained above with reference to FIG. 13. A perforated strip for filing was also provided in the laminated transparency sheet.

An OHP transparent film was made using a color laser printer film, commercially available as Product No. CG3700 by Sumitomo 3M Co. The transparent film was loaded in a color laser printer (Color Laser Shot LBP-2040 by Canon, Inc.) for color image printing to fabricate a full color transparency sheet.

Separately, a polyethylene terephthalate (PET) film (Lumirror 50T-60, product of Toray Co., Ltd.) was prepared as a transparent film base material to make an image covering laminate film. A polycoat liner (commercially available from Rexam Co.) made by polyethylene coating and silicone treating a PET base material was made as a release liner. A master tool having a surface with a fine uneven structure of shape and dimensions corresponding to the desired fine uneven structure of the adhesive layer of the laminate film was used to emboss one side of the release liner. This step produced a release liner having an uneven surface corresponding to the fine uneven structure of the master tool. The uneven structure of the release liner corresponds to and is exactly opposite to the fine uneven structure (regular pyramidal structure) to be formed on the surface of the adhesive layer fabricated in this example.

After mixing 100 parts of isooctyl acrylate (3M Co.) and 0.04 part of 2,2-dimethoxy-1,2-diphenylethan-1-one (IRGACURE 651, trade name of Ciba Specialty Chemicals Co., Ltd.), the mixed solution was irradiated with ultraviolet rays in a nitrogen atmosphere for partial photopolymerization. To the resulting syrup, which had a coatable viscosity, was added 0.2 part of 2,2-dimethoxy-1,2-diphenylethan-1-one and 0.2 part of 1,6-hexanediol diacrylate (KS-HDDA, trade name of Nippon Kayaku Co., Ltd.). The obtained syrup was coated at a thickness of 75 μm between one side of the film base material prepared in the previous step and the uneven structure-bearing side of the release liner. The coated solution was irradiated with ultraviolet rays to complete the photopolymerization. Hardening of the syrup produced a laminate film with an adhesive layer having the structure described above with reference to FIG. 1. The surface of the adhesive layer of the resulting laminate film had a regular pyramidal uneven structure. The size of the uneven structure was as follows, based on FIG. 2. Pitch p between protrusions: 197 μm; height h of protrusions from bottoms of continuous grooves: 13 μm.

Also, a 16 mm wide storage strip (ET film) with small filing holes was attached and fixed to one edge of the film base material of the laminate film using clear tape (Scotch600, commercially available from Sumitomo 3M Co.).

After releasing the release liner from the strip-attached laminate film it was attached to the toner image-bearing side of a previously fabricated transparency sheet via the adhesive layer. The laminate film was attached by hand lamination, but a rubber roller with a width of 47 mm and a diameter of 40 mm was used for light pressing to contact bond the laminate film to the transparency sheet. This produced an OHP laminated transparency sheet with the cross-sectional structure described above with reference to FIG. 13. Because of the good air removability of this laminated transparency sheet, there were no defects due to residual air and produced a high quality projected color image. The perforated strip of the laminated transparency sheet was used for easy filing in a binder.

Evaluation of Color Image Quality

For evaluation of the color image quality, laminated transparency sheets were made by the same procedure as above, except for forming monochrome (yellow, magenta, cyan, red, green and blue) toner images instead of a full color image.

The Q factor of each of the laminated transparency sheets was measured using a haze meter (TC-HIII, trade name of,Tokyo Denshoku Co., Ltd.). Because the toner image of a transparency sheet usually results in a high level of light scattering and because such light scattering produces turbidity or clouding of the color of the projected image, measurement of the Q factor is especially useful for evaluation of the transparency sheet image quality. The Q factor can be very accurately measured by the ratio of the light scattering with respect to the transmitted light (light contributing to the color image formation). The Q factor is defined by the following formula.

$$Q\text{ factor}=\{(\text{light attenuation due to absorption})+(\text{light attenuation due to scattering})\}/(\text{light attenuation due to absorption})$$

In the above formula, the lower limit for the Q factor is 1. This represents a case in which the light attenuation due to light scattering is zero. A smaller Q factor indicates improved transparency of the projected image.

Table 1 below contains a summary of the measurement results for the Q factors of the laminated transparency sheets. The "Prior art" listed in Table 1 for comparison is a transparency sheet having a monochrome toner image formed by the same procedure described above on a conventional OHP transparent film.

TABLE 1

| | Q factor | | | | | |
|---|---|---|---|---|---|---|
| | Yellow | Magenta | Cyan | Red | Green | Blue |
| Laminated transparency sheet (Present invention) | 12.9 | 1.4 | 1.5 | 1.8 | 2.5 | 1.3 |
| Prior art | >100 | 2.8 | 4.2 | 3.0 | 5.0 | 2.9 |

The measurement results in Table 1 indicate that each of the laminated transparency sheets having the laminate film fabricated for this example attached to the image-bearing side exhibited a small Q factor for projection of color images, or in other words, had high light transmittance. The laminate film of the invention can therefore provide color images with excellent light transparency.

Example 2

1. Fabrication of Transparency Sheet

The "CG3700" color laser printer film used in Example 1 was prepared as an OHP transparent film. The transparent film was loaded into a color laser printer (Color LaserJet 4500, Hewlett-Packard) for monochrome (red, green, blue, yellow, magenta and cyan) color image printing to fabricate a total of 6 different transparency sheets.

Next, the light transmittance (%) of the red, green, blue and yellow color image-bearing transparency sheets was measured in a wavelength range of 380-820 nm. The light transmittance was measured using a #62601 UV-Viscosity spectrophotometer by SMMD Analytical Laboratory Co., Ltd. The results of a series of measurements were plotted as shown in FIGS. 14 to 17, and the averaged and summarized measurement results shown in Table 2 were obtained. In each of these graphs, CR is the red image transparency sheet, CG is the green image transparency sheet, CB is the blue image transparency sheet and CY is the yellow image transparency sheet. (C stands for "comparison").

The haze values (%) and diffuse reflection values (%, average values for wavelengths of 380-720 nm) for the red, green, blue and yellow color image-bearing transparency sheets were measured using a BYK-Gardner TCS Plus spectrophotometer, giving the measurement results listed in Table 3 below.

2. Fabrication of Laminate Film

An image covering laminate film was fabricated according to the same procedure as Example 1. For this example, however, the polyethylene terephthalate (PET) film used was one by 3M Co., and the uneven structure was formed in the following manner.

After mixing 90 parts of n-butyl acrylate (Aldrich Co.) and 10 parts of 2-ethylhexyl acrylate (Aldrich Co.), the obtained mixed solution was irradiated with ultraviolet rays in a nitrogen atmosphere for partial photopolymerization. The obtained syrup was coated to a thickness of 3 mils (76 μm) between one side of the film base material prepared in the previous step and the uneven structure-bearing side of the release liner, and irradiated with ultraviolet rays to complete the photopolymerization. The surface of the adhesive layer of the resulting laminate film had a regular pyramidal uneven structure. The size of the uneven structure was as follows, based on FIG. 2. Pitch p between protrusions: 197 μm; height h of protrusions from bottoms of continuous grooves: 13 μm.

3. Fabrication of Laminated Transparency Sheet

After releasing the release liner from the laminate film, it was attached to the toner image-bearing side of a previously fabricated transparency sheet via the adhesive layer. No pressure was applied yet at this stage, but hand lamination was done using a rubber roller with a width of 47 mm and a diameter of 40 mm. The rubber roller was lightly pressed from left to right, top to bottom and center to outside. This produced an OHP laminated transparency sheet with the laminate film contact bonded to the toner image side. Because of the satisfactory air removability of this laminated transparency sheet, there were no defects due to residual air and produced a high quality projected color image.

4. Measurement of Light Transmittance Haze Value and Diffuse Reflection of Laminated Transparency Sheet The light transmittance (%) of the red, green, blue and yellow color image-bearing laminated transparencies fabricated in 3. above was measured in a wavelength range of 380-820 nm in the same manner as 1. above, and upon plotting the data as shown in FIGS. 14 to 17, the averaged and summarized measurement results shown in Table 2 were obtained. In each of these graphs, R is the red image laminated transparency sheet, G is the green image laminated transparency sheet, B is the blue image laminated transparency sheet and Y is the yellow image laminated transparency sheet.

The haze values (%) and diffuse reflection values (%, average values for wavelengths of 380-720 nm) for the red, green, blue and yellow color image-bearing laminated transparency sheets were measured using a BYK-Gardner TCS Plus spectrophotometer, giving the measurement results listed in Table 3 below.

TABLE 2

| | Transmittance (%, average value for 380-820 nm) | | | |
|---|---|---|---|---|
| | Red | Green | Blue | Yellow |
| Laminated transparency sheet (Present invention) | 35.09 | 12.39 | 17.33 | 54.52 |
| Prior art | 17.43 | 5.71 | 6.28 | 19.96 |

TABLE 3

| | Haze value (%) | | | | Diffuse reflection (%, average value for 380-720 nm) | | | |
|---|---|---|---|---|---|---|---|---|
| | Red | Green | Blue | Yellow | Red | Green | Blue | Yellow |
| Laminated transparency sheet (Present invention) | 67.5 | 76.1 | 43.5 | 57.0 | 4.55 | 2.03 | 2.36 | 5.21 |
| Prior art | 78.2 | 94.6 | 63.8 | 90.7 | 6.97 | 4.58 | 4.68 | 8.21 |

The measurement results in Tables 2 and 3 indicate that each of the laminated transparency sheets having the laminate film fabricated for this example attached to the image-bearing side exhibits superior light transmittance and can prevent haze and diffuse reflection, and therefore allows projection of color images with notably higher quality compared to a conventional transparency sheet with no laminate film.

5. Evaluation of Color Image Quality

For evaluation of the color image quality, the Q values of cyan, magenta and yellow color image-bearing laminated transparency sheets fabricated by the same procedure as above and a corresponding transparency sheet (prior art) without a covering laminate film, fabricated for comparison, were measured using a haze meter (TC-HIII, trade name of Tokyo Denshoku Co., Ltd.), by the same procedure as in Example 1.

Table 4 below contains a summary of the measurement results for the Q factors of the laminated transparency sheets.

TABLE 4

| | Q factor | | |
|---|---|---|---|
| | Cyan | Magenta | Yellow |
| Laminated transparency sheet (Present invention) | 1.6 | 1.5 | 6.7 |
| Prior art | 3.1 | 1.9 | 13.8 |

The measurement results in Table 4 indicate that each of the laminated transparency sheets having the laminate film fabricated for this example attached to the image-bearing side exhibited a small Q factor for projection of color images, i.e., had high light transmittance. The laminate film of the invention can therefore provide color images with excellent light transparency.

Example 3

An image covering laminate film provided with an adhesive layer such as explained above with reference to FIG. 4 and FIG. 5 was made and used for making of a laminated transparency sheet for an OHP as explained above with reference to FIG. 13.

In the same manner as Example 1, a color laser printer film (Product No. CG3700 by Sumitomo 3M Co.) was loaded in a color laser printer (Color Laser Shot LBP-2040 by Canon, Inc.) for printing to make a full color transparency sheet.

Separately, a PET film (Lumirror 50T-60, trade name of Toray Co., Ltd.) was prepared in the same manner as Example 1, and a polycoat liner (commercially available from Rexam Co.) obtained by polyethylene coating and silicone treatment of a PET base material was prepared as a release liner. A master tool having a surface with a group of fine protrusions of shape and dimensions corresponding to the desired fine protrusions of the adhesive layer of the laminate film was then used for embossing one side of the release liner. This produced a release liner having a surface with fine protrusions corresponding to the group of fine protrusions of the master tool.

Next, a cluster of glass beads with a diameter of about 5 to 30 μm (commercially available as "Expancel" by Nobel Industries Co. of Sweden) was packed into the depressions formed on the release liner. For packing the glass beads, they were first dispersed in a cellulose resin to prepare a slurry solution. The slurry solution then was applied onto one side with a screen coater. The excess beads were scraped off with a doctor blade.

A fine uneven structure was then formed in the surface of the release liner by reembossing. The re-embossing was carried out in the same manner as the previous step. The fine uneven structure formed here had a shape and dimensions corresponding to the intended fine uneven structure of the adhesive layer of the laminate film.

After mixing 93.5 parts of isooctyl acrylate (3M Co.), 6.5 parts of acrylic acid (Wako Junyaku Industries) and 0.04 part of 2,2-dimethoxy-1,2-diphenylethan-1-one (IRGACURE 651, trade name of Chiba Specialty Chemicals Co., Ltd.), the mixed solution was irradiated with ultraviolet rays in a nitrogen atmosphere for partial photopolymerization. To this syrup there was further added 0.2 part of 2,2-dimethoxy-1,2-diphenylethan-1-one. The obtained syrup was coated to a thickness of 75 μm between one side of the film base material prepared in the previous step and the uneven structure-bearing side of the release liner, and was irradiated with ultraviolet rays to complete photopolymerization. Hardening of the syrup produced a laminate film with an adhesive layer having the structure described above with reference to FIG. 1. The surface of the adhesive layer of the resulting laminate film had a regular pyramidal uneven structure and was packed with glass beads. The size of the uneven structure was as follows, based on FIG. 4. Pitch $p_1$ between protrusions: 197 μm; height $h_1$ of protrusions from bottoms of continuous grooves: 13 μm; pitch $p_2$ between glass beads 300 μm; and height $h_2$ of glass beads from bottoms of continuous grooves: 20 μm.

After removing the release liner from the laminate film, it was attached to the toner image-bearing side of a previously fabricated transparency sheet via the adhesive layer. The laminate film was attached by hand lamination, but a rubber roller with a width of 47 mm and a diameter of 40 mm was used for light pressing to contact bond the laminate film to the transparency sheet. This produced an OHP laminated transparency sheet with the cross-sectional structure described above with reference to FIG. 13. Because of the good air removability of this laminated transparency sheet, there were no defects due to residual air and produced a high quality projected color image.

Evaluation of Color Image Quality

For evaluation of the color image quality, laminated transparency sheets were fabricated by the same procedure as above, except for forming monochrome (yellow, magenta, cyan, red, green and blue) toner images instead of a full color image.

The Q factor of each of the laminated transparency sheets was measured using a haze meter (TC-HIII, trade name of Tokyo Denshoku Co., Ltd.), by the same procedure as Example 1 above.

Table 5 below contains a summary of the measurement results for the Q factors of the laminated transparency sheets. The "Prior art" listed in Table 5 is a transparency sheet having a monochrome toner image formed by the same procedure described above on a conventional OHP transparent film.

Example 4

The method described in Example 3 above was repeated, but for this example the adhesive layer was formed in the following manner.

A mixed solution of 100 parts of butyl acrylate (Mitsubishi Chemical Co.) and 0.04 part of 2,2-dimethoxy-1,2-diphenylethan-1-one (IRGACURE 651, trade name of Chiba Specialty Chemicals Co., Ltd.) was UV irradiated in a nitrogen atmosphere for partial photopolymerization, to prepare a coatable syrup.

To this syrup there were added 0.2 part of 2,2-dimethoxy-1,2-diphenylethan-1-one and 0.1 part of 1,6-hexanediol diacrylate (KS-HDDA, trade name of Nippon Kayaku Co., Ltd.). The syrup was used to fabricate a laminate film in the same manner as Example 3.

Because of the good air removability of the resulting OHP laminated transparency sheet, there were no defects due to residual air and produced a high quality projected color image.

Next, for evaluation of the color image quality, the same method described in Example 3 above was repeated to fabricate laminated transparency sheets. The Q factor of each of the laminated transparency sheets was measured using a haze meter (TC-HIII, trade name of Tokyo Denshoku Co., Ltd.), giving the measurement results shown in Table 5 below.

TABLE 5

| | Q factor | | | | | |
|---|---|---|---|---|---|---|
| | Yellow | Magenta | Cyan | Red | Green | Blue |
| Example 3 | 16.7 | 1.4 | 1.5 | 1.8 | 2.7 | 1.3 |
| Example 4 | 15.7 | 1.4 | 1.4 | 1.7 | 2.5 | 1.3 |
| Prior art | >100 | 2.8 | 4.4 | 3.0 | 5.2 | 2.9 |

The measurement results in Table 5 indicate that each of the laminated transparency sheets having the laminate film fabricated in Examples 3 and 4 attached to the image-bearing side exhibited a small Q factor for projection of color images, Le., had high light transmittance. The laminate film of the invention can therefore provide color images with excellent light transparency.

Example 5

For this example, an OHP laminated transparency sheet was produced in the same manner as Example 3 above except for using an image covering laminate film provided with an adhesive layer such as explained above with reference to FIG. 8.

The image covering laminate film was fabricated in the following manner.

First, a mixed solution of 100 parts of isooctyl acrylate (3M Co.) and 0.04 part of 2,2-dimethoxy-1,2-diphenylethan-1-one (IRGACURE 651, trade name of Chiba Specialty Chemicals Co., Ltd.) was UV irradiated in a nitrogen atmosphere for partial photopolymerization, to prepare a coatable syrup.

To this syrup there were added 0.2 part of 2,2-dimethoxy-1,2-diphenylethan-1-one and 0.25 part of 1,6-hexanediol diacrylate (KS-HDDA, trade name of Nippon Kayaku Co., Ltd.). An adhesive layer was formed from the syrup by the same method as Example 1. For this example, the syrup was coated between a PET liner as the transparent film base material and a Polyslick liner (commercially available from Inncoat Co.) as the release liner. When the adhesive layer was UV irradiated for photopolymerization, it exhibited a fine structure on its surface with the following dimensions based on FIG. 8: Pitch p=197 μm, height h=10 μm, continuous groove bottom width $d_1$=3 μm, continuous groove top width $d_2$=15 μm.

After removing the release liner from the laminate film, it was hand laminated onto the color image of an OHP transparent film. The resulting OHP laminated transparency sheet had no defects due to residual air, and produced a high quality projected color image.

Measurement of the Q factor of the obtained color image gave the results shown in Table 6 below.

Example 6

For this example, an OHP laminated transparency sheet was produced in the same manner as Example 3 above except for using an image covering laminate film provided with an adhesive layer such as explained above with reference to FIG. 10.

The image covering laminate film was fabricated in the following manner.

First, a mixed solution of 100 parts of isooctyl acrylate (3M Co.) and 0.04 part of 2,2-dimethoxy-1,2-diphenylethan-1-one (IRGACURE 651, trade name of Chiba Specialty Chemicals Co., Ltd.) was UV irradiated in a nitrogen atmosphere for partial photopolymerization, to prepare a coatable syrup.

To this syrup were added 0.2 part of 2,2-dimethoxy-1,2-diphenylethan-1-one and 0.15 part of 1,6-hexanediol diacrylate (KS-HDDA, trade name of Nippon Kayaku Co., Ltd.). An adhesive layer was formed from the syrup by the same method as Example 1. For this example, the syrup was coated between a PET liner as the transparent film base material and a Polyslick liner (commercially available from Inncoat Co.) as the release liner. When the adhesive layer was then UV irradiated for photopolymerization, the adhesive layer exhibited a fine structure on its surface with the following dimensions based on FIG. 10: Pitch p=197 μm, height $h_1$=15 μm, height $h_2$=10 μm, continuous groove bottom width $d_1$=3 μm, continuous groove top width $d_2$=20 μm, double mechanism base length $d_3$=38 μm.

After removing the release liner from the laminate film, it was hand laminated onto the color image of an OHP transparent film. The resulting OHP laminated transparency sheet had no defects due to residual air, and produced a high quality projected color-image.

Measurement of the Q factor of the obtained color image gave the results shown in Table 6 below.

TABLE 6

| | Q factor | | | | | |
|---|---|---|---|---|---|---|
| | Yellow | Magenta | Cyan | Red | Green | Blue |
| Example 5 | 5.4 | 1.4 | 1.4 | 1.6 | 2.5 | 1.4 |
| Example 6 | 5.6 | 1.4 | 1.4 | 1.6 | 2.4 | 1.3 |

The measurement results in Table 6 indicate that the color images treated with the laminate films obtained in Examples 5 and 6 had small Q factors (i.e., high light transparency). These laminate films of the invention can therefore provide color images with excellent light transparency.

As explained above, a laminate film according to the invention can be used without capturing and incorporating air as air bubbles under the adhesive layer during application onto adherends. In cases where air bubbles are present, it allows them to be easily removed by the attachment procedure (i.e., the air removability is satisfactory). The fine continuous grooves in the adhesive layer used for expelling air bubbles is eliminated after lamination, so that there is no adverse effect on light scattering.

Furthermore, because the laminate film of the invention exhibits even better slidability on the surface of adherends by the action of fine particles loaded therein, it is possible to achieve easier and more accurate positioning and attachment operations.

According to the invention, therefore, when laminating and attaching onto OHP transparent films, the toner image surface is flattened to reduce scattering of transmitted light, thereby allowing enhancement of image quality. It also allows for hand lamination at room temperature without the need for special lamination equipment or skills. The attachment manageability and especially the positionability, slidabllity and air removability of the inventive laminate film are all satisfactory and reattachment can be carried out if necessary.

According to the invention there may be provided image covering laminate films that can improve the storage and filing properties of OHP transparency sheets.

According to the invention there may also be provided image projection sheets with excellent quality of projected images and superior handleability and storage properties.

What is claimed is:

1. An image covering laminate film for covering of an image carried by a support, comprising:

a transparent base material; and a transparent adhesive layer formed on one side of the base material, and wherein said adhesive layer is composed of a pressure-sensitive adhesive and has a surface with a fine uneven structure containing non-adhesive fine particles, wherein said uneven structure of the surface of said adhesive layer defines continuous grooves configured to expel air trapped between said laminate film and the image-bearing side of said support when the laminate film is attached to the image-bearing side of said support, and wherein the uneven structure itself has a shape and dimensions allowing it to be incorporated into said adhesive layer and to disappear once the attachment is complete.

2. An image covering laminate film according to claim 1, characterized in that said fine particles are glass beads.

3. An image covering laminate film according to claim 1, characterized by being further provided with a release liner covering said adhesive layer.

4. An image covering laminate film according to claim 1, characterized in that said laminate film further includes a strip which extends out at a prescribed length from the edge.

5. An image covering laminate film according to claim 1, characterized in that said support is a transparent plastic film with a toner image fusion bonded to its surface.

6. An image projection sheet comprising (a) a transparent support, (b) a toner image carried on the surface of the support, and (c) the laminate film of claim 1, wherein said adhesive layer of said laminate film is disposed on said toner image.

7. An image projection sheet according to claim 6, characterized in that said laminate film further includes a strip which extends out at a prescribed length from the edge.

8. An image projection sheet according to claim 6, characterized in that it is used for an overhead projector.

9. An image covering laminate film according to claim 1, characterized in that the uneven structure of the surface of said adhesive layer defines a double mechanism structure.

10. An image covering laminate film according to claim 9, characterized in that the double mechanism structure comprises a first structure having a first surface, and a second structure positioned on the first surface.

* * * * *

UNITED STATES PATENT AND TRADEMARK OFFICE

CERTIFICATE OF CORRECTION

PATENT NO. : 7,276,278 B2

APPLICATION NO. : 10/490974
DATED : October 2, 2007
INVENTOR(S) : Koji Kamiyama

It is certified that error appears in the above-identified patent and that said Letters Patent is hereby corrected as shown below:

*Column 5
Line 67, After "to" delete "is"

Column 6
Line 52, Delete "hi" and insert -- $h_1$ --, therefor

Column 7
Line 29, Delete "(PEI)" and insert -- (PET) --, therefor
Line 37, Delete "ie.," and insert -- i.e.. --, therefor
Line 58, Delete "allkyl" and insert -- alkyl --, therefor Column 9
Line 44, Delete "ie.," and insert -- i.e.. --, therefor Column 12
Line 61, Delete "(ET film)" and insert -- (PET film) --, therefor Column 13
Line 24, Delete "of,Tokyo" and insert -- of, Tokyo --, therefor (consider space)

Column 18
Line 34, Delete "Le.," and insert -- i.e., --, therefor

Column 19
Line 40, Delete "color-image" and insert -- color image --, therefor

UNITED STATES PATENT AND TRADEMARK OFFICE

CERTIFICATE OF CORRECTION

PATENT NO. : 7,276,278 B2
APPLICATION NO. : 10/490974
DATED : October 2, 2007
INVENTOR(S) : Koji Kamiyama It is certified that error appears in the above-identified patent and that said Letters Patent is hereby corrected as shown below:

Column 20
Lines 10-11, Delete “slidabllity”

Signed and Sealed this

Eleventh Day of December, 2007

JON W. DUDAS
*Director of the United States Patent and Trademark Office*